Oct. 29, 1957 R. B. BEARD 2,811,037
CONSTITUENT POTENTIAL MEASURING APPARATUS
Filed June 29, 1953 2 Sheets-Sheet 1
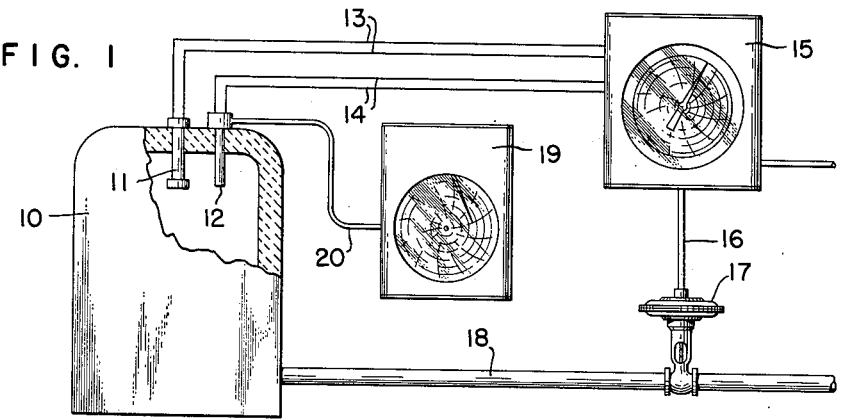
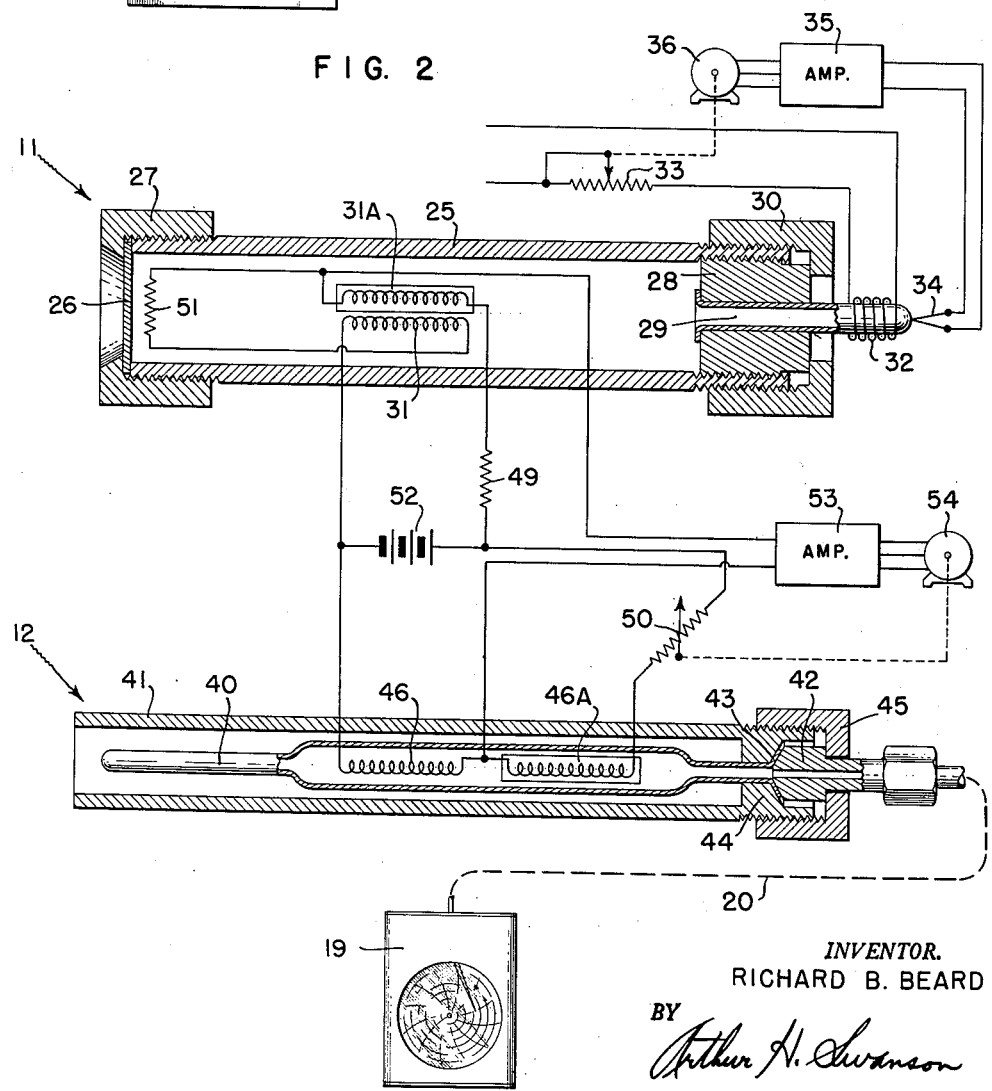
INVENTOR.
RICHARD B. BEARD
BY
Arthur H. Swanson
ATTORNEY.

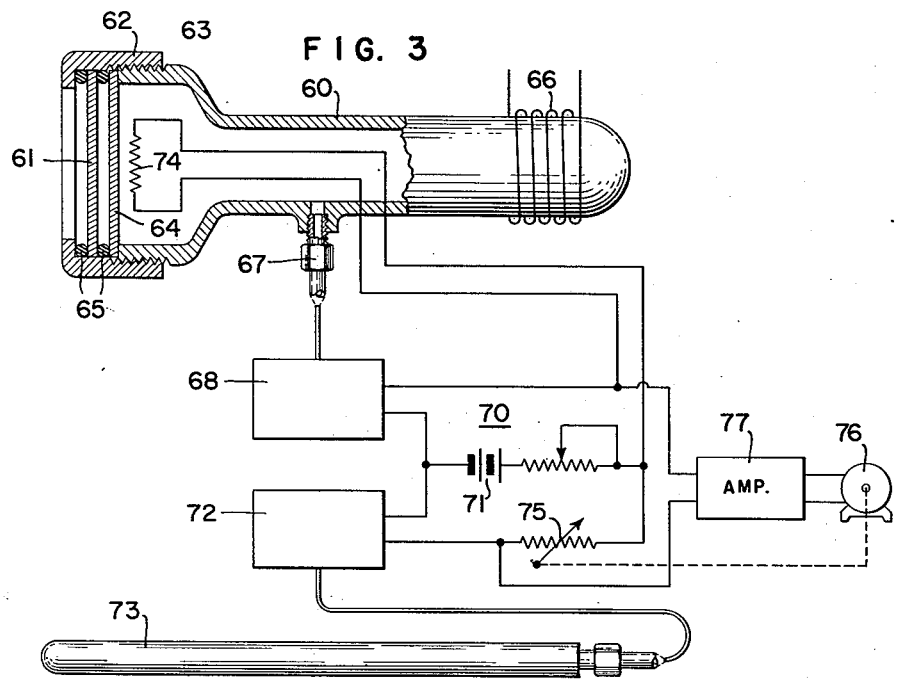
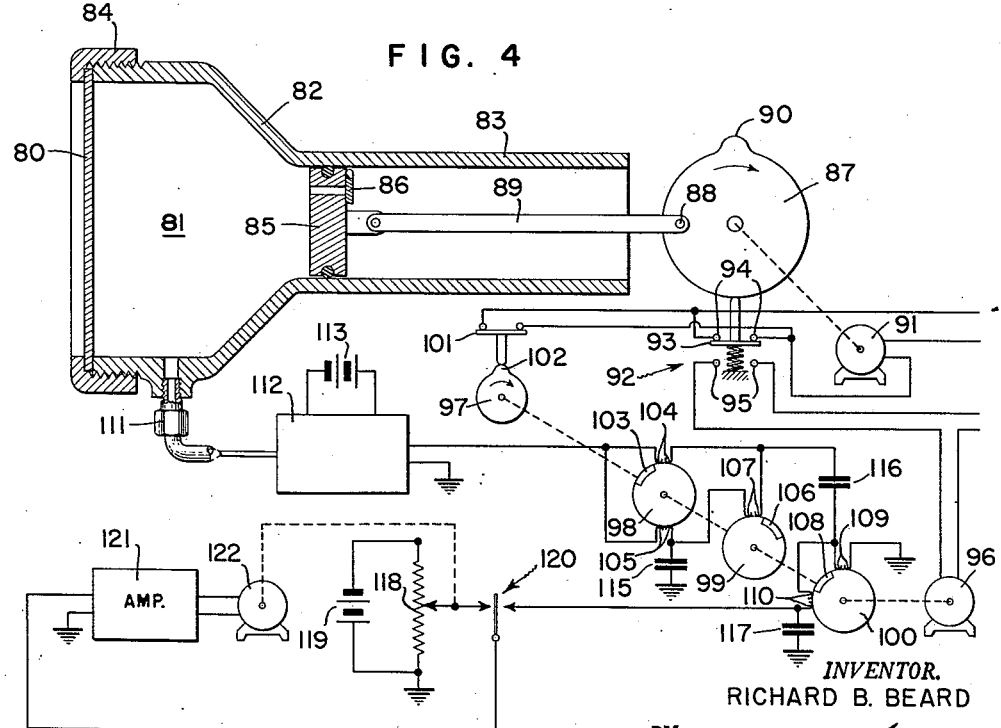

United States Patent Office 2,811,037
Patented Oct. 29, 1957

2,811,037

CONSTITUENT POTENTIAL MEASURING APPARATUS

Richard B. Beard, Philadelphia, Pa., assignor to Minneapolis-Honeywell Regulator Company, Minneapolis, Minn., a corporation of Delaware Application June 29, 1953, Serial No. 364,666

18 Claims. (Cl. 73—23)

A general object of the present invention is to provide an improved apparatus for determining a constituent potential of a gaseous atmosphere. More specifically, the invention is concerned with an improved constituent measuring apparatus for a gaseous atmosphere which is characterized by its ability to accurately determine the constituent potential of the atmosphere as well as an apparatus which is readily serviced with the principal sensing elements thereof replaceable.

The apparatus of the present invention is especially useful in the field of sensing and controlling the atmospheric conditions within a heat treating furnace. The heat treatment of various metals is frequently accomplished with the metal being surrounded by a gaseous atmosphere which contains as a constituent thereof components which it is desired to sorb on the surface of the metal being treated. Thus, in the heat treatment of steel, carbon bearing gaseous atmospheres are frequently used with the steel sorbing carbon from the atmosphere whenever the carbon potential of the atmosphere is higher than that of the steel. Conversely, if the carbon potential of the atmosphere is lower than that of the steel, carbon will be transferred from the steel back to the gas with equal rapidity. The same applies to the addition of nitrogen or other constituents to steel or other metals. The word "sorb" and its derivatives are used in this case as the generic expression which encompasses both absorb and adsorb. The definition of "sorb" is given in the 1955 edition of "Webster's New International Dictionary-Unabridged" as —"to take up and hold either by adsorption or absorption".

It has been found that one of the most satisfactory methods of determining the effects of a heat treating atmosphere is to place a sample or representative element within the atmosphere and determine the manner in which the heat treating gas atmosphere reacts with this element. By measuring a characteristic of this element it is possible to indicate fairly accurately the constituent potential of the atmosphere.

It has been observed that certain materials are capable of permeating therethrough gaseous atmospheres. The permeability of the atmosphere through the element will be dependent upon its absorption, diffusion, and deabsorption of the atmospheric components. In other words, the permeability of the element to pass the atmosphere therethrough will be dependent upon its state of carburization or the sorbtion and reaction of the carbon with the material of the element. It is this selective permeability characteristic which is used in forming a sensing element for use in the present invention. It has further been observed that certain elements have selective permeability characteristics which will permit the elements to permeate therethrough only selected gases or constituents of an atmosphere. A palladium tube or element will permeate therethrough hydrogen with great rapidity when the palladium element is heated. This selective permeability characteristic is likewise incorporated in the apparatus of the present invention.

It is accordingly a more specific object of the present invention to provide an improved constituent potential measuring apparatus for a gaseous atmosphere employing an element whose permeation rate is dependent upon a constituent potential of the atmosphere.

Another more specific object of the present invention is to provide an improved atmospheric analyzing apparatus incorporating a permeable element whose gaseous permeation rate is dependent upon the amount of a constituent from the atmosphere sorbed in the element.

Still another more specific object of the present invention is to provide a constituent measuring apparatus for a gaseous atmosphere which incorporates a first permeable element which has a variable permeability dependent upon the constituent potential of the atmosphere and a second permeable element having a selective gaseous permeability characteristic.

Still another object of the present invention is to provide an improved constituent measuring apparatus employing a pair of chambers having thermal conductivity cells therein with one of the chambers having gas permeated therethrough at a rate dependent upon the constituent potential of the atmosphere and the other chamber serving as a reference.

Another object of the present invention is to provide an improved constituent potential measuring apparatus for an atmosphere using means for making a pressure measurement proportional to the constituent potential of the atmosphere.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

Of the drawings:

Fig. 1 is a schematic showing of a heat treating furnace and the present invention applied thereto as a control;

Fig. 2 shows diagrammatic representations of the sensing elements used in the apparatus shown in Fig. 1;

Fig. 3 shows a modified sensing apparatus; and

Fig. 4 shows a further modification for speeding up the constituent potential measurement.

Referring to Fig. 1, the numeral 10 represents a heat treating or carburizing furnace whose atmosphere may be controlled by the present invention. A pair of sensing elements 11 and 12 project into the furnace with the electrical output of the elements being passed by way of leads 13 and 14 to a suitable indicating and controlling instrument 15. This instrument may well take the form of the apparatus shown in the Walter P. Wills Patent, 2,423,540, issued July 8, 1947. The instrument 15 is effective to receive the electrical signals from the leads 13 and 14 and produce an appropriate indication on the recording chart thereof and also produce an output control pressure in a conduit 16. As shown, this output control pressure may be used to operate a gas flow control valve 17 which may be used to regulate the flow of an enriching gas through a conduit 18 into the furnace 10. The apparatus of Fig. 1 may also include a pressure recording instrument 19 which is connected to the sensing element 12 by way of a conduit 20. The instrument 19 may be incorporated into a complete control system such as is shown in my copending application entitled Control Apparatus, bearing Serial No. 364,711 and filed on even date herewith.

The apparatus of Fig. 1 is effective by way of the sensing elements 11 and 12 to provide an electrical signal indicative of the atmospheric conditions within the furnace 10 and the instrument 15 will produce a controlling action which will be effective to correct the atmospheric conditions to a desired value. If desired, the operator in charge of the furnace may manually reset the instrument 15 in accordance with the indication on the instrument 19. More specifically, if the atmospheric conditions within the furnace 10 are constant, so that the hydrogen content of the atmosphere within the furnace is constant, the need for resetting the instrument 15 in accordance with the instrument 19 is not present. However, due to the fact that the hydrogen content of the enriching gas does not always remain constant, corrective adjustments may be desirable, as has been set forth in the above mentioned copending application.

As viewed in Fig. 2, the sensing element 11 comprises a cylindrical housing 25 having one end thereof sealed by a diaphragm or thin sheet of metal 26. This sheet 26 is held in position by a threaded locking member 27. The other end of the cylinder 25 is sealed by plug element 28 having a palladium tube 29 extending through the center thereof to a position outside of the cylinder. The plug 28 is maintained in position by a further locking member 30 which threadedly engages the outer circumference of the cylinder 25. The cylinder 25 becomes a chamber sealed by the element 26, the plug 28 and the tube 29. Positioned within the cylinder 25 is a thermal conductivity cell 31 and this cell may well take the form of an electrical wire having heat applied thereto with the heat dissipated from the wire by the atmosphere surrounding the cell in accordance with the contents of that atmosphere. Also positioned within the cylinder 25 is a shielded temperature compensating cell 31A.

The palladium tube 29 is arranged to be heated by a suitable heater 32 which heater has the electrical current therefore adjusted by an adjustable rheostat 33. The rheostat 33 is adjusted in accordance with the temperature sensed by a thermocouple 34 acting through a conventional amplifier 35 and motor 36.

The sensing element 12 comprises an elongated palladium tube 40 which is surrounded by a metallic protecting member 41. The tube 40 forms a chamber which is connected by a conduit 20 to the instrument 19. The inner portion of the tube 40 is effectively isolated from the external atmosphere by a bushing 42 which depresses a flared end 43 of the tube 40 against an anchor element 44. The bushing 42 is firmly fastened in position by an element 45 which threadedly engages the outer surface of the protective tube 41. Positioned within the tube 40 is a thermal conductivity cell 46 and this cell functions in a normal manner with the electrical resistance of the cell being determined by the rate at which the heat thereof is conducted away by the atmosphere immediately surrounding the element. Also within the tube 40 is a shielded temperature compensating cell 46A.

The thermal conductivity cells 31, 31A, 46, and 46A are connected into an electrical network. This network comprises a fixed resistor 49 and an adjustable balancing slidewire resistor 50. Also included in the network is a temperature compensating resistor 51 which is exposed to the temperature condition of the plate or sheet 26. Power is supplied to the network by way of a conventional power supply such as a battery 52.

The output of the bridge is detected by an amplifier 53 which may be effective to reversibly drive a control motor 54, the latter of which is effective to adjust the balancing slidewire resistor 50 in the network.

In considering the operation of the apparatus shown in Fig. 2 it is first assumed that the sheet or element 26 is formed of a material which will be sensitive to the constituent potential of the atmosphere within the furnace 10. If the carbon potential of a heat treating atmosphere is to be determined, the sheet 26 will generally take the form of an iron sheet of relatively thin dimension which sheet will be effective to come to a carbon equilibrium with the atmosphere in a relatively short time. As the gases within the heat treating furnace are quite hot, the element 26 will be heated by this hot atmosphere and the element will tend to permeate the atmosphere therethrough. The rate of permeation through the element 26 has been found to be proportional to the amount of carbon sorbed in and reacted with the iron of the element. In addition to other gases in the furnace, the atmosphere will contain hydrogen as one of the constituents. This hydrogen will also permeate through the element 26.

The heated palladium tube 29 will be effective to act as a window for hydrogen within the chamber defined by the cylinder 25 and the hydrogen within the chamber will escape through the tube to a suitable exhausting apparatus, not shown.

The thermal conductivity element 31 will be heated by the current flowing from the battery 52 and this heat will vary the resistance of the element. Since hydrogen and other gases are present within the chamber, the heat from the wire 31 will be conducted away therefrom and this will tend to cool the wire by an amount which is dependent upon the atmosphere immediately surrounding the element. As hydrogen is an excellent gas for conducting away heat, it will be seen that the heat from the element will be carried away therefrom primarily in accordance with the amount of hydrogen passing through the chamber. Since tube 29 acts effectively as an open window to the hydrogen, the only restriction to hydrogen flow will be the element 26 which will have its diffusion characteristic varied in accordance with the constituent or carbon potential of the gas affecting the same, i. e. its state of carburization.

If the hydrogen present in the furnace 10 were always constant, it would not be necessary to provide a reference signal and the network could be operated directly without the presence of the thermal conductivity cell 46 positioned in the tube 40. However, due to the fact that the hydrogen content of the atmosphere in the furnace may vary, it is essential that some reference be established to eliminate the effect of such changes. The element 46 positioned within the palladium tube 40 serves to establish the reference. The palladium tube 40, heated by the atmosphere of the furnace 10, will permeate hydrogen therethrough by an amount proportional to the partial pressure of the hydrogen in the atmosphere in the furnace. This partial pressure may be indicated on the instrument 19.

Since the conductivity cell 46 is heated in a manner corresponding to the heating of the cell 31, this heat will be conducted away from the cell in accordance with the amount of hydrogen present immediately surrounding the element. This conductivity cell 46 will then act as a reference for giving an indication of the partial pressure of hydrogen in the furnace atmosphere and the conductivity cell 31 will give an indication of the rate at which hydrogen is being permeated through the chamber defined by the cylinder 25.

Any unbalance in the network due to a difference in the electrical resistance of the elements 46 and 31 will be balanced out by the amplifier 53 driving the motor 54 which repositions the rebalancing slidewire resistor 50. The positioning of the slidewire resistor 50 will give a signal indicative of the carbon potential existing in the furnace 10.

Inasmuch as the diffusion rate of the element 26 is also dependent in part upon the temperature thereof, the temperature compensating resistor 51 has been added to the network. As the temperature of the element goes up, the diffusion rate will increase. Conversely, if the temperature of the element 26 goes down, the diffusion will also go down. Thus, by proper selection of the temperature sensing resistor 51, it is possible to cancel out the effects of ambient temperature change on the element 26. Further, changing the area of the plate 26 may be used to vary the amount of gas which will diffuse therethrough.

Referring back to Fig. 1, if the sensing element 11 detects a carbon potential in the atmosphere within the furnace 10 different from that desired, the apparatus will be effective to vary the flow of enriching gas to the furnace 10 by way of the instrument 15 and valve 17 so as to bring the carbon potential of the atmosphere back to the desired value. Further, if the sensing element 12 indicates a variation in the hydrogen content of the atmosphere, this variation will introduce a compensating or regulating effect to eliminate the change.

Referring now to Fig. 3, there is shown the present invention incorporated in an apparatus for determining carbon potential by measuring a pressure in a chamber which pressure is proportional to the amount of carbon in the atmosphere. Here, a palladium tube 60 defines a chamber which has as an inlet an iron sheet 61. This sheet is fastened in position by a suitable bushing 62 which threadedly engages the tube 60 at 63. The bushing 62 also holds a further palladium sheet 64 in position with the iron sheet 61 being separated from the sheet 64 by suitable separating means 65 to prevent the iron from reacting with the palladium at the high temperatures. The opposite end of the tube 60 is heated by a heater 66 which heater is preferably automatically controlled so as to maintain the temperature of the end of the tube constant.

A pressure connection is made to the tube 60 at 67 and this pressure connection leads to a suitable pressure to electric transducer 68 which will produce an output electrical signal proportional to the pressure applied thereto. This transducer is connected into an electrical network 70 which has power supplied thereto by a battery 71. Also included in the network 70 is another pressure to electric transducer 72 which receives its input pressure from an ambient partial pressure sensing element 73 which may be made of palladium and exposed to the space where the end sheet 61 is placed. The network 70 additionally includes a temperature compensating resistor 74 and a rebalancing resistor 75 which is arranged to be adjusted by a motor 76 driven by a suitable amplifier 77.

The operation of Fig. 3 is basically the same as that of Fig. 2. Here, the iron sheet 61 will sorb and react with carbon from the heat treating atmosphere and this will vary the permeability of the sheet to the other atmosphere constituents. The hydrogen permeated through the sheet 61 will also permeate through the palladium sheet 64. When the hydrogen passes through the sheet 64, it will be within the tube 60 and the pressure in the tube 60 will be dependent upon the rate at which the hydrogen is drawn off, by means not shown, from the heated end of the tube 60. It will be readily apparent that this pressure will be a measure of the carbon potential of the atmosphere adjacent the outer surface of the sheet 61. The pressure in the tube will be sensed by the transducer 68 which will create a condition in the network 70 which will be balanced out by the amplifier 77 driving the motor 76 and thus the rebalancing resistor 75.

As the permeation rate of sheet 61 will be dependent in part upon the pressure within the space, it is necessary to compensate for this. The tube 73 will provide a hydrogen partial pressure measurement which, when acting through transducer 72, will compensate for ambient atmospheric pressure changes as well as the changes in the partial hydrogen pressure since the hydrogen is what is used in the tube 60. The resistor 74 serves to provide for compensating temperature changes in the sheets 61 and 64. The end result is that the adjustment required of the rebalancing resistor 75 will determine the carbon potential of the atmosphere adjacent the sheet 61.

Fig. 4 shows a further modified apparatus which is somewhat simplified from the apparatus shown in Figs. 2 and 3. Here, an iron sheet 80 covers the entrance to a chamber 81 which is formed by housing 82 having a hollow cylindrical extension 83. Holding the sheet 80 in position is a bushing 84 which threadedly engages the housing 82. A piston 85 is arranged to move within the cylindrical extension 83. This piston has an exhausting port and valve 86 therein and is arranged to be reciprocated by the rotative operation of a driving wheel 87 having an eccentric 88 which is connected to the piston 85 by rod 89. The wheel 87 carries a switching cam surface 90 and the wheel is driven by a suitable electrical motor 91. The cam surface 90 cooperates with a switch 92 which has an upper position, where it is normally biased, in which a bar 93 shorts a pair of contacts 94. When the bar 93 is lowered, it shorts a pair of contacts 95.

The contacts 95 are used to control the operation of a sequence timing motor 96. This timing motor drives a plurality of timing cams 97, 98, 99, and 100. The cam 97 has a switch 101 cooperating therewith with the switch being closed when a cam surface 102 strikes the same. The cam 98 carries a shorting segment 103 which cooperates with contacts 104 and 105. The cam 99 carries a shorting segment 106 which cooperates with a pair of contacts 107. The cam 100 carries a shorting segment 108 which cooperates with a pair of contacts 109 and a further pair of contacts 110.

The output from the chamber 81 is a pressure signal which is taken out by a pressure connection 111 which leads to a suitable pressure to electric transducer 112 which is powered by a battery 113. The output of the transducer 112 on leads 114 will be a voltage signal which is dependent upon the input pressure to the transducer. This signal is used to charge a plurality of condensers 115, 116, and 117 in accordance with the switching action of the sequence timer driven by motor 96. The output voltage on condenser 117 is compared with a potentiometer voltage derived from a balancing slidewire resistor 118 which is supplied with power by a battery 119. A vibrating contactor switch is used to alternately apply the voltage from the condenser 117 and slidewire resistor 118 to the input of an amplifier 121. The amplifier 121 is arranged to reversibly drive a motor 122, the latter of which is used to reversibly adjust the slidewire resistor 118.

The operating principles of the present figure are basically the same as that of Figs. 2 and 3 inasmuch as the rate of permeation of the atmosphere through the sheet 80 will be dependent upon the amount of carbon sorbed therein. Here, however, the chamber 81 is periodically pumped by the operation of the piston 85. As the piston goes forward, the valve 86 will open and the gases in the chamber will escape. When the piston moves back, the valve 86 is sealed and a partial vacuum will be created in chamber 81 with the vacuum being greatest when the back stroke is completed. After a short interval, gases will permeate through the sheet 80 and the pressure in chamber 81 will build up. The rate of buildup will be a measure of the permeability of the sheet 80. By making a pressure measurement at the start, or point of greatest partial vacuum, and at a later time, and comparing the two, a signal proportional to the permeability of sheet 80 may be obtained. This measurement may be accomplished by the switching apparatus shown.

More specifically, the piston will be driven forward by the action of the wheel 87 driven by motor 91. The piston will exhaust the air in chamber 81 by way of valve 86 and then a partial vacuum is created on the return stroke. When the return stroke is completed, the switching surface 90 will move the bar 93 downward to short contacts 95. The shorting of contacts 95 will start the sequence timing motor 96. The motor will first move the surface 102 so that switch 101 will open and motor 91 will stop. Next, the shorting segment 103 will short contacts 104 and the segment 108 will short contacts 109. At this instant, the voltage on leads 114 will be applied to charge condenser 116. This charging circuit may be traced by way of the upper lead 114, through contacts 104, condenser 116 and contacts 109 to ground.

The next switching operation occurs when the cams have moved 180° further. Here, segment 103 will short contacts 105 to complete a charging circuit for condenser 115. This circuit may be traced from the upper lead 114 through contacts 105, condenser 115 to ground. Since the pressure in chamber 81 will have increased during the time interval between the closing of contacts 104 and 105, the voltage on leads 114 will also have increased. This will mean that the condenser 115 will have a larger voltage than the voltage on condenser 116.

The next switching operation occurs when the condensers 116 and 115 are connected in series opposition with each other to condenser 117. The circuit is completed by the segment 106 shorting contacts 107 and the segment 108 shorting contacts 110. The circuit may be traced from the upper terminal of condenser 115 through contacts 107, condenser 116, contacts 110, condenser 117 and ground back to the lower terminal of condenser 115. Thus, the condenser 117 will receive a charge proportional to the difference in voltage across the condensers 115 and 116, or the difference in the pressures in the chamber 81 at the start and after a time delay. When the motor 96 moves the cam 99 back to the position where surface 102 closes switch 101, the motor 91 will again be energized and the surface 90 will reclose the contacts 94 and open contacts 95 to de-energize the timing motor 96 until the next time that the surface 90 strikes switch 92.

The voltage or charge on the condenser 117 will be compared with the voltage on the slidewire resistor 118 by the operation of the contacting vibrator 120. The amplifier 121 will detect any differences and drive the motor 122 in a direction to effect a balance. The balance point may be calibrated in terms of carbon potential in the atmosphere wherein the sheet 80 is positioned.

It will be obvious that temperature and pressure compensation may be required under certain circumstances and this may be accomplished in the electrical circuits using the principle set forth in Figs. 2 and 3. Further, there are many other ways in which the pressures in chamber 81 may be measured and compared.

While, in accordance with the provisions of the statutes, there has been illustrated and described preferred embodiments of the invention, those skilled in the art will understand that changes may be made in the form of the apparatus disclosed without departing from the spirit of the invention as set forth in the appended claims, and that some features of the present invention may be used to advantage without a corresponding use of other features.

Having now described my invention, what I claim as new and desire to secure by Letters Patent is:

1. A heat treating atmosphere analyzing apparatus comprising, an element which is, when heated, permeable to the heat treating atmosphere, said element reacting with and sorbing a constituent of the atmosphere and having a permeability which is variable in accordance with the amount of said constituent that is sorbed therein, a chamber having as an inlet said element, a second gaseous permeable element providing an outlet from said chamber for a selected atmospheric constituent which enters said chamber through said first mentioned element, and means for measuring the permeation rate through said chamber of said selected atmospheric constituent to determine the amount of the first mentioned constituent present in the atmosphere.

2. The invention as set forth in claim 1 wherein said means for measuring comprises a pressure sensing means connected to said chamber arranged to produce a signal indicative of the constituent potential of said atmosphere.

3. The invention as set forth in claim 1 wherein said means for measuring comprises a pressure sensing means connected to said chamber arranged to produce a signal indicative of the constituent potential, and means are provided for automatically controlling the permeability of said second element.

4. Apparatus for measuring the carbon potential of a gaseous atmosphere having other gaseous constituents in addition to carbon, said apparatus comprising, a thin sheet of ferrous metal which when heated is permeable to the gaseous atmosphere to which it is exposed, said sheet reacting with and sorbing carbon from said atmosphere in an amount corresponding to the carbon potential of the atmosphere whereby to vary the permeability of said sheet in accordance with said carbon potential, a chamber having as an inlet said sheet, an outlet for said chamber for a selected atmospheric constituent which enters said chamber through said first mentioned element, said outlet comprising a second gaseous permeable element, and means for measuring the permeation through said chamber of said selected atmospheric constituent to obtain a measure of the carbon present in the atmosphere.

5. Apparatus for measuring the carbon potential of a gaseous atmosphere which also includes hydrogen comprising, a thin sheet of ferrous metal which when heated is permeable to the gaseous atmosphere to which it is exposed, said sheet reacting with and sorbing carbon from said atmosphere in an amount corresponding to the carbon potential of the atmosphere, a chamber having as an inlet said sheet, an outlet for said chamber in the form of a second gaseous permeable element, said second element having a selective permeability to hydrogen in the gaseous atmosphere, and means for measuring the flow of hydrogen through said chamber to obtain a measure of the carbon potential of the atmosphere.

6. Apparatus for measuring a constituent potential of a gaseous heat treating atmosphere comprising a gaseous permeable element which is subjected to the gaseous heat treating atmosphere and which will react with and sorb the constituent of the gas to be measured to vary the rate of penetration of the atmosphere through the element, a chamber having an inlet formed by said element, an outlet for said chamber for a selected atmospheric constituent which enters said chamber through said first mentioned element, said outlet comprising a second gaseous permeable element, means for maintaining the temperature of said second element at a desired value, and means for measuring the rate of penetration of said selected constituent through said chamber to obtain a measure of the constituent potential of the atmosphere.

7. Apparatus as defined in claim 6 wherein said second element is in the form of a palladium element which is penetrable by hydrogen in the atmosphere.

8. Apparatus for measuring the carbon potential of a gaseous heat treating atmosphere comprising, means defining a chamber having a thermal conductivity cell therein, an inlet to said chamber comprising a ferrous element which is permeable to the gaseous atmosphere, when heated thereby, at a rate dependent upon the reaction with and sorbtion of carbon therein, and electrical measuring means connected to said cell to obtain a measure of gaseous flow through said chamber of a selected constituent of said atmosphere to which said cell is responsive, which flow is proportional to the carbon potential of the atmosphere.

9. Apparatus for measuring the carbon potential of a gaseous heat treating atmosphere comprising, a chamber having a thermal conductivity cell therein, an inlet to said chamber comprising a ferrous element which, when heated, is permeable to the gaseous atmosphere at a rate dependent upon the reaction with and sorbtion of carbon therein, an outlet from said chamber for a selected constituent of said atmosphere to which said cell is responsive comprising a temperature controlled gaseous permeable element, and electrical measuring means connected to said cell to obtain a measure of the flow through said chamber of said selected constituent, which flow is proportional to the carbon potential of the atmosphere.

10. Apparatus for measuring the carbon potential of a gaseous heat treating atmosphere comprising, a chamber having a thermal conductivity cell therein, an inlet to said chamber comprising a ferrous element which, when heated, is permeable to the gaseous atmosphere at a rate dependent upon the reaction with and sorbtion of carbon therein, a palladium gaseous permeable element forming an outlet from said chamber for a selected constituent of said atmosphere to which said cell is responsive, means for regulating the temperature of said palladium element, and electrical measuring means connected to said cell to obtain a measure of the flow through said chamber of said selected constituent, which flow will be proportional to the carbon potential of the atmosphere.

11. Apparatus for measuring the carbon potential of a gaseous atmosphere comprising, a chamber having a thermal conductivity cell therein, an inlet to said chamber comprising a ferrous element which will permeate therethrough the gaseous atmosphere at a rate dependent upon the carbon absorbed therein, a second gaseous permeable element positioned as an outlet for said chamber, a third gaseous permeable element positioned to be exposed to the atmosphere and having a second thermal conductivity cell therein, said second thermal conductivity cell acting as a reference, and electrical means connected to both of said conductivity cells to determine the rate of flow through said chamber to indicate the carbon potential of said atmosphere.

12. Apparatus as defined in claim 11 wherein said second gaseous permeable element is a temperature controlled palladium element and said third gaseous permeable element is a palladium element exposed to the atmosphere whose carbon potential is being measured.

13. Apparatus for measuring the carbon potential of a gaseous atmosphere comprising, a chamber having a thermal conductivity cell therein, an inlet to said chamber comprising a ferrous element which will permeate therethrough the gaseous atmosphere at a rate dependent upon the carbon absorbed therein, a second gaseous permeable element positioned as an outlet for said chamber, a third gaseous permeable element positioned to be exposed to the atmosphere and having a second thermal conductivity cell therein, said second thermal conductivity cell acting as a reference, means responsive to the temperature of said ferrous element, and an electrical measuring circuit connected to said conductivity cells and including said temperature responsive means, said measuring circuit having an electrical output indicative of the carbon potential of the atmosphere.

14. Apparatus for measuring a constituent potential of an atmosphere comprising, a first chamber having as an inlet a first gaseous permeable element which will have a variable permeation rate dependent upon the constituent potential of the atmosphere, an outlet for said chamber for a selected atmospheric constituent which enters said chamber through said first mentioned element, said outlet comprising a second gaseous permeable element, a second chamber having as an inlet a third gaseous permeable element arranged for positioning directly in the atmosphere and penetrable by a selected constituent of said atmosphere, and means for measuring the difference between the gaseous conditions of said first and second chambers to indicate the constituent potential of the atmosphere.

15. Apparatus as claimed in claim 14 wherein said second and third gaseous permeable elements are penetrable by hydrogen in the atmosphere.

16. Apparatus as claimed in claim 14 wherein said second and third gaseous permeable elements are of substantially the same temperature so that their permeability constants are substantially the same.

17. A controller for a carburizing atmosphere in a heat treating furnace comprising, a ferrous metal element which when heated is permeable to gases from the atmosphere at a rate dependent upon the extent of reaction with and sorbtion of carbon therein from the atmosphere, means for measuring the rate of penetration through said element of a selected constituent of said atmosphere other than carbon, hydrogen partial pressure sensing means arranged to be positioned to sense the hydrogen partial pressure in the atmosphere, measuring means responsive to the difference between the rate of penetration and the hydrogen partial pressure; and control means for the atmosphere adjusted by said measuring means.

18. Apparatus for measuring the carbon potential of a gaseous atmosphere comprising, a chamber having a thermal conductivity cell therein, an inlet to said chamber comprising a ferrous element which is exposed to and permeable, when heated, to the gaseous atmosphere to an extent dependent upon the reaction with and sorbtion of carbon at the exposed surface thereof, a second gaseous permeable element permeable, when heated, to a selected constituent of said atmosphere to which said cell is responsive and positioned as an outlet for said chamber, a third gaseous permeable element positioned to be exposed to the atmosphere and having a second thermal conductivity cell therein, said second thermal conductivity cell acting as a reference, and electrical means connected to both said conductivity cells to determine the rate of flow through said chamber of said selected constituent to indicate the carbon potential of said atmosphere.

References Cited in the file of this patent

UNITED STATES PATENTS

| 1,174,631 | Snelling | Mar. 7, 1916 |
|---|---|---|
| 1,645,404 | Ringrose | Oct. 11, 1927 |
| 2,162,395 | Bennett | June 13, 1939 |
| 2,279,231 | Gier | Apr. 7, 1942 |
| 2,400,940 | McCollum | May 28, 1946 |
| 2,456,163 | Watson | Dec. 14, 1948 |
| 2,459,618 | Cartier | Jan. 18, 1949 |
| 2,541,857 | Besselman et al. | Feb. 13, 1951 |
| 2,671,336 | Hulsburg | Mar. 9, 1954 |
| 2,671,337 | Hulsburg | Mar. 9, 1954 |

FOREIGN PATENTS

| 213,587 | Great Britain | Apr. 30, 1925 |

OTHER REFERENCES

Metals Reference Book, Smithels, Interscience Pub. New York, 1949, pp. 387–388. (Copy in Library of U. S. Pat. O.)